(12) United States Patent
Scott (10) Patent No.: US 8,499,899 B2
(45) Date of Patent: Aug. 6, 2013

(54) OVER-CENTER CLAMPING WHEEL CHOCKS

(75) Inventor: Gary M. Scott, Milwaukie, OR (US)

(73) Assignee: Progress Mfg. Inc., Provo, UT (US)

( * ) Notice: Subject to any disclaimer, the term of this patent is extended or adjusted under 35 U.S.C. 154(b) by 0 days.

(21) Appl. No.: 11/827,378

(22) Filed: Jul. 10, 2007

(65) Prior Publication Data

US 2008/0073162 A1 Mar. 27, 2008

Related U.S. Application Data

(60) Provisional application No. 60/830,145, filed on Jul. 10, 2006.

(51) Int. Cl.
*B60T 3/00* (2006.01)
(52) U.S. Cl.
USPC ............... 188/32; 188/4 R; 188/36; D12/217
(58) Field of Classification Search
USPC ............... 188/32, 4 R, 36; D12/217; 70/18, 70/225, 226; 410/30, 49
See application file for complete search history.

(56) References Cited

U.S. PATENT DOCUMENTS

| | | | |
|---|---|---|---|
| 1,174,410 A | 3/1916 | Hajasok | |
| 2,442,501 A * | 6/1948 | Mast et al. | 188/32 |
| 2,461,248 A * | 2/1949 | Wright | 188/32 |
| 2,475,111 A * | 7/1949 | Ridland | 188/32 |
| 2,522,328 A | 9/1950 | Wiswell et al. | |
| 2,822,063 A | 8/1953 | Hampton | |
| 2,720,285 A * | 10/1955 | Taylor | 188/32 |
| 2,773,564 A | 12/1956 | Garard | |
| 2,998,102 A * | 8/1961 | Deverich | 188/32 |
| 3,518,846 A | 7/1970 | Vogel et al. | |
| 3,537,546 A | 11/1970 | Kiosk | |
| 3,547,228 A * | 12/1970 | Wiley | 188/32 |
| 3,687,238 A | 8/1972 | Carpenter | |
| 3,695,394 A * | 10/1972 | Carpenter | 188/32 |
| 3,845,844 A | 11/1974 | Woerner | |
| 4,031,726 A | 6/1977 | De Jager | |
| D245,416 S | 8/1977 | Carpenter | |
| D254,432 S | 3/1980 | Schessl | |
| 4,649,724 A | 3/1987 | Raine | |
| 4,804,070 A * | 2/1989 | Bohler | 188/32 |
| 4,828,076 A * | 5/1989 | Fox | 188/32 |

(Continued)

FOREIGN PATENT DOCUMENTS

| | | | | |
|---|---|---|---|---|
| DE | 3322973 A1 * | 1/1985 | | 188/32 |
| DE | 3322973 A1 | 1/1985 | | |

*Primary Examiner* — Robert A Siconolfi
*Assistant Examiner* — Mariano Sy
(74) *Attorney, Agent, or Firm* — Clayton, Howarth & Cannon, P.C.

(57) ABSTRACT

A wheel chock system for preventing movement of one or more wheels. The system may include a pair of chocks for clamping onto one or more wheels. The chocks may be connected through a linkage mechanism that can be rotated to draw the chocks together or move the chocks further apart. A handle may be attached to the linkage mechanism for moving the chock system from a blocking position to a released position. The handle may be configured to stand upright such that the chock system can be installed and removed by a user in a standing position without the need to bend or crouch. One embodiment of the chock system may be attachable to two different wheels in a tandem wheel arrangement, whereas another embodiment of the chock system may be configured to clamp onto a single wheel.

25 Claims, 5 Drawing Sheets

(56) References Cited

U.S. PATENT DOCUMENTS

| | | |
|---|---|---|
| 4,917,219 A | 4/1990 | Henry |
| D328,588 S | 8/1992 | Mitchell |
| 5,368,134 A | 11/1994 | Rickman et al. |
| 5,465,814 A | 11/1995 | Ziaylek |
| 5,490,582 A | 2/1996 | Trowbridge |
| 5,547,045 A | 8/1996 | Stutzman |
| D385,526 S | 10/1997 | Hinkle |
| 5,769,186 A | 6/1998 | Roberts |
| 5,887,462 A | 3/1999 | Stone |
| 5,913,389 A | 6/1999 | Clark |
| 5,927,443 A | 7/1999 | Collins, Jr. |
| 6,092,970 A | 7/2000 | Hahn et al. |
| 6,116,062 A | 9/2000 | Markegard et al. |
| 6,336,527 B1 | 1/2002 | Metz |
| 6,378,956 B1 | 4/2002 | Van de Walker |
| 6,425,465 B1 * | 7/2002 | Tallman et al. ............. 188/32 |
| 6,478,525 B2 | 11/2002 | Hageman et al. |
| 7,032,720 B2 | 4/2006 | Jette et al. |
| 7,299,902 B2 * | 11/2007 | Thorpe ......................... 188/32 |
| 2007/0050999 A1 * | 3/2007 | Milner et al. ................ 33/286 |

* cited by examiner

OVER-CENTER CLAMPING WHEEL CHOCKS

CROSS-REFERENCE TO RELATED APPLICATIONS

This application claims the benefit of U.S. Provisional Application No. 60/830,145, filed Jul. 10, 2006, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Invention

The present disclosure relates generally to wheel blocking devices, and more particularly, but not necessarily entirely, to wheel chock systems that can clamp onto one or more wheels to prevent the wheels from rolling.

2. Description of Related Art

It is common practice to provide wheel chocks or blocks for placement against one or more wheels of a wheeled vehicle while the vehicle is parked to prevent the wheels from rolling. Chocks may be particularly useful for trailers or other vehicles that are commonly provided without parking brakes. The chocks are often wedge shaped or curved to more closely correspond to the contour of the wheels, though the chocks may have various different configurations.

Wheel chocks often require a person installing the chocks to bend down to ground level to position the chocks against the wheels. Also, the chocks are often manually forced against the wheels and sometimes leave a gap between the wheels and the chocks. Such gaps may allow the wheels to start rolling. Once the vehicle starts rolling and gains momentum due to the weight of the vehicle, the resulting forces applied to the chocks may cause the chocks to fail and allow the vehicle to continue to move. Accordingly, even a small gap between the chocks and the wheel may cause the chocks to fail, particularly on sloped or gravel surfaces.

Also, releasing the chocks again often requires a person to bend down to ground level to pull the chocks out from under the wheels. If the wheels have rolled against the chocks or if the chocks have been firmly pressed against the wheels, it may sometimes be difficult to release the chocks from under the wheels.

Other known embodiments of chocks require rotating screw devices or turnbuckles to apply or release pressure on the chocks to install or remove the chocks. Many rotations of the screw or turnbuckle mechanisms may be required to apply pressure to the wheels during installation, and an equal number of rotations of the mechanisms may be required to remove the chocks. Such chock installation mechanisms may thus require excessive time and energy to install and remove the chocks from vehicle wheels.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present wheel chock devices and methods are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

As used herein, the phrase "opposing directions," shall be construed broadly to include directions that are not the same. For example, two objects may move in "opposing directions" if the objects move towards each other, or away from each other. However, if the two objects move in the same direction, they would not be moving in "opposing directions."

As used herein, the phrase "adjusting an extent," as in adjusting an extent one object may move with respect to another, shall refer broadly to the concept of adjusting the distance or relative position or both, that one object may move with respect to another.

Figure 1:
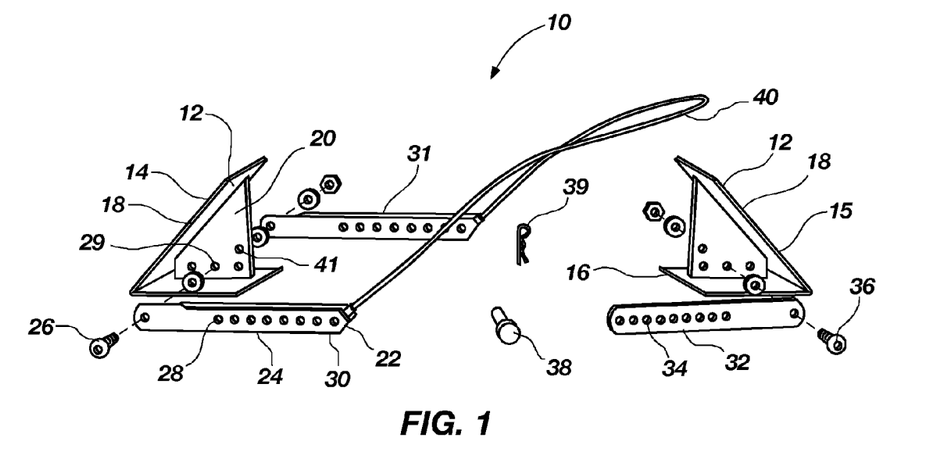
FIG. 1 is an exploded perspective view of one embodiment of a wheel chock system in accordance with the principles of the present disclosure.
Figure 2:
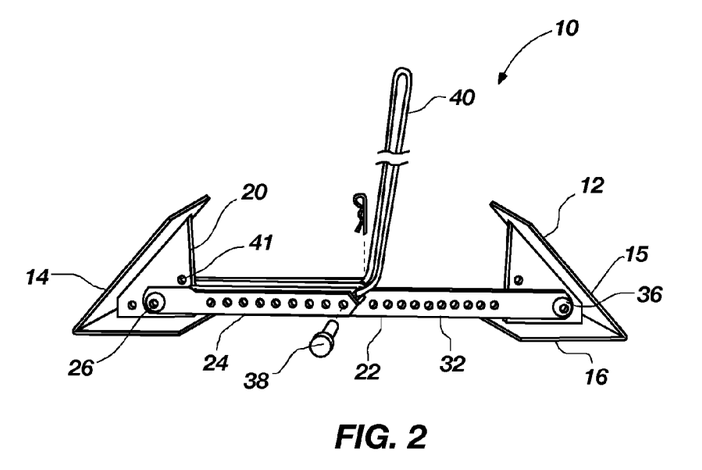
FIG. 2 is a perspective view of the wheel chock system of FIG. 1.

Referring now to FIG. 1, an exploded perspective view is shown of one embodiment of a wheel chock system, indicated generally at 10. The wheel chock system 10 may include one or more chocks 12, such as a first chock 14 and a second chock 15. The chocks 12 may comprise a base 16 for supporting the chocks 12 on a surface, such as a road, floor, or the ground, for example. The chocks 12 may also include a blocking surface 18 that may project at an angle with respect to the base 16. Accordingly, one embodiment of the chocks 12 may be formed in a substantially wedge shaped configuration. However, it will be understood that other embodiments of the chocks 12 may be formed such that the blocking surface 18 may have a concave curve to correspond more closely with the shape of a wheel, or the blocking surface 18 may be formed to be rounded or substantially perpendicular with respect to the base 16, or the blocking surface 18 may have any other suitable configuration within the principles of the present disclosure.

One embodiment of the present disclosure may include the blocking surface 18 on the first chock 14 that may face in a direction away from the blocking surface 18 on the second chock 15. Accordingly, this embodiment may be configured to be attached between tandem wheels on a vehicle.

The chocks 12 may include a support 20 between the base 16 and the blocking surface 18. The support may be formed as a wall, or alternatively, the support may be formed as one or more rods, or the support 20 may be formed as a solid member integral with the base 16 and the blocking surface 18 to substantially fill the space between the base 16 and the blocking surface 18. Moreover, it will be understood that some embodiments of the chocks 12 may be formed without a support 20.

Figure 4:
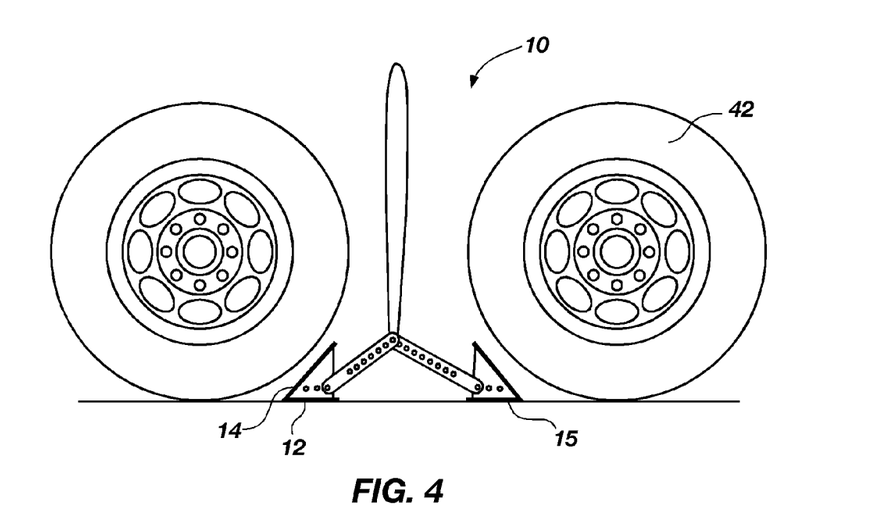
FIG. 4 is a side view of the wheel chock system of FIG. 1 in a partially released position prior to being installed between tandem wheels of a vehicle.
Figure 5:
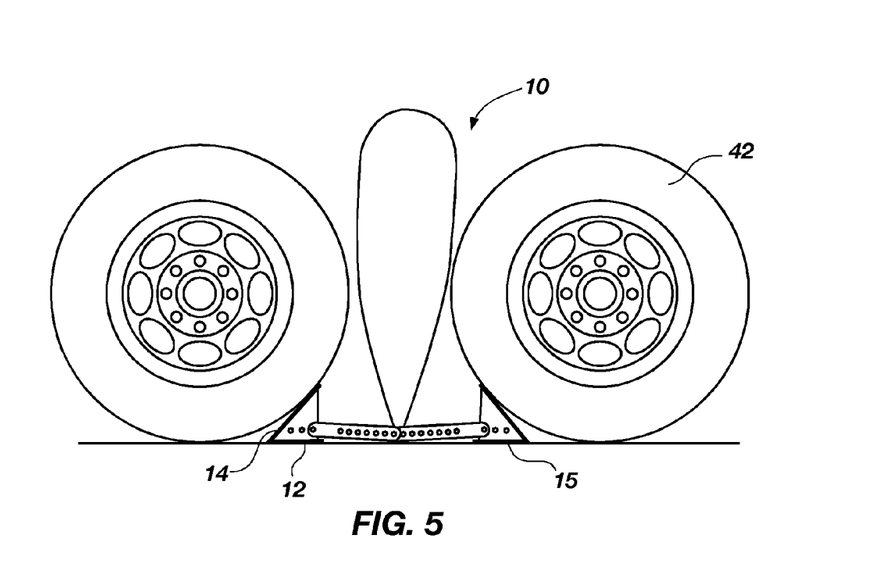
FIG. 5 is a side view of the wheel chock system of FIG. 1 in a blocking position between tandem wheels of a vehicle.

The wheel chock system 10 may also include a linkage or linkage mechanism 22 for adjusting the chocks 12 between a released position, as shown most clearly in FIG. 4, and a blocking position, as shown most clearly in FIG. 5. The linkage mechanism 22 may include a first lever 24 that may be pivotally attached to the first chock 14 through a first pivot 26 to allow the first lever 24 to rotate with respect to the first chock 14. It will be understood that the first lever 24 may include one or more openings 28 for aligning with corresponding openings 29 in the first chock 14 for receiving the first pivot 26 therethrough. It will be understood that a position of attachment of the first lever 24 with respect to the first chock 14 may be adjusted by selecting different openings 29 for attaching the first lever 24 to the first chock 14. Accordingly, a distance between the first chock 14 and the second chock 15 may be adjusted so that the chock system 10 may be installed on vehicles having different sized wheels, or different spacing distances between tandem wheels. It will be understood that various different adjusting mechanisms, such as screw adjustments, slot or notch adjusting mechanisms, or telescoping members, for example, may be used within the principles of the present disclosure.

It will be understood that one embodiment of the first lever 24 may include a first portion 30 and a second portion 31 that may be positioned on opposite sides of the support 20. The first portion 30 and the second portion 31 may be connected together through the first pivot 26. Alternatively, it will be understood that the first lever 24 may be formed of a single piece member that may be joined on one side of the support 20. Moreover, it will be understood that the support 20 may be formed with two walls such that the first lever 24 may be positioned between the two walls. Accordingly, it will be understood that the first lever 24 may have various different configurations for attachment to the first chock 14 in any suitable manner.

The linkage mechanism 22 may also include a second lever 32 that may be attached to the second chock 15. The second lever 32 may be configured in a manner similar to the first lever 24. For example, the second lever 32 may have one or more openings 34 for attaching the second lever 32 to the second chock 15 through a second pivot 36. As shown in FIG. 1, the second lever 32 may be formed as a single member for attachment to one side of the support 20, or alternatively, the second lever 32 may have multiple members.

The first lever 24 may be joined to the second lever 32 through a third pivot 38. Accordingly, it will be understood that the first lever 24 and the second lever 32 may be allowed to rotate with respect to each other at the third pivot 38. One embodiment of the linkage mechanism 22 may include the second lever 32 received between the first portion 30 of the first lever 24 and the second portion 31 of the first lever 24. The third pivot 38 may be received through a selected opening 28 in the first lever 24 and a selected opening 34 in the second lever 32. Thus, it will be understood that the third pivot 38 may be received in various different openings to adjust the distance between the first chock 14 and the second chock 15 when the chock system 10 is in the blocking position, as shown in FIG. 5. Moreover, it will be understood that various different holding devices, such as a clip 39, may be used to hold the third pivot 38 in place. The third pivot 38 and clip 39 may be configured as a clevis pin such that it may be easily installed without the use of tools to facilitate adjustment of the length and pressure characteristics of the chock system 10. Accordingly, the chock system 10 may be versatile for use with vehicles having various different distances between wheels, and wheels of various different sizes. Moreover, it will be understood that the first lever 24 may be locked to the second lever 32 by inserting a locking member, such as a padlock, in the overlapping openings 28, 34, such that the chock system 10 may be locked in place.

It will be understood that the first pivot 26, the second pivot 36 and the third pivot 38, may each be formed of a bolt, pin, rod, or the like for allowing rotational movement of one object with respect to another about the pivot. It will also be understood that any variety of holding devices known in the art, such as nuts, clips, pins, or the like, may be used to hold the pivots in place.

One embodiment of the chock system 10 may include a handle 40. The handle 40 may be attached to the linkage mechanism 22 through either the first lever 24, the second lever 32, or the third pivot 38, for example. The handle 40 may extend upwardly to allow a user to adjust the linkage mechanism 22 by pulling the handle while the user is in a standing position. Accordingly, the handle 40 may allow for easy and quick installation and removal of the chock system 10.

One embodiment of the handle 40 may be formed of a material such as a coated cable or a wire that may have sufficient rigidity to stand upright so that the handle 40 may be accessed without requiring the user to bend or crouch, yet the handle 40 may be flexible to allow for ease in manipulating and storage of the handle 40. One embodiment of the handle may be formed as a loop to facilitate grasping the handle 40 and applying a pulling force to the handle. Alternatively, it will be understood that the handle 40 may be formed of a substantially rigid rod member that may be accessible while the user is in a standing position. Moreover, it will be understood that one embodiment of the present disclosure may include a handle that does not extend upwardly to enable a user to grasp the handle while in a standing position. Yet another embodiment of the chock system 10 may be formed without a handle 40.

One or both of the chocks 12 may also include a lock hole 41. The lock hole 41 may be configured for receiving a stop member, such as a padlock, pin, bolt, or the like. The lock hole 41 may be positioned so that when a stop is inserted in the lock hole 41, rotation of the linkage 22 with respect to the stop may be blocked by contact between the linkage 22 and the stop. Accordingly, the chock system 10 may be locked in the blocking position.

Figure 3:
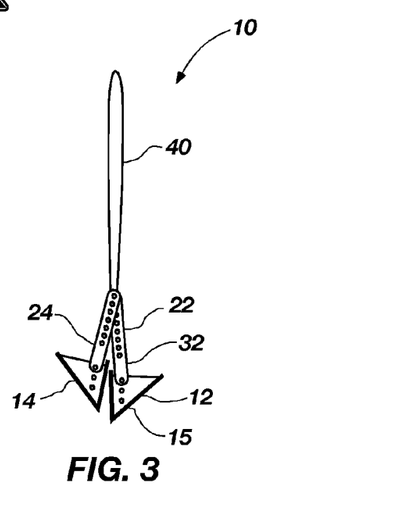
FIG. 3 is a side view of the wheel chock system of FIG. 1 in a released position.

Referring to FIG. 3, it will be understood that the first lever 24 may be rotated about the pivot 38 with respect to the second lever 32. Accordingly, the chock system 10 may be configured to be folded or arranged in a compact configuration to facilitate transporting and storing the chock system 10. The chock system 10 can be grasped by the handle 40 to allow the chock system 10 to be easily carried using a single hand.

In use, the chock system 10 may be placed on the ground, floor, or roadway surface between tandem wheels 42 as shown in FIG. 4. The user may then place his or her foot on the linkage mechanism 22 at or near the third pivot 38, or otherwise press the linkage mechanism 22 downwardly, such that the chocks 12 move apart to press against the wheels 42 in a blocking position, as shown in FIG. 5. The blocking surface 18 of the chocks 12 may contact the wheels 42, and the base 16 of the chocks 12 may be pressed against the ground such that the chocks 12 may be held tightly in place. Installation of the chock system 10 may thus be accomplished quickly with little effort.

One feature of the present disclosure may include a facilitated method of installing the chock system 10. As shown in FIG. 3, the second lever 32 may be joined to the first lever 24 such that the first chock 14 may extend beyond the second chock 15 as the chock system 10 is being carried by the handle 40. This arrangement may be accomplished by providing the second lever 32 with a longer dimension than the first lever 24, or by attaching the second lever 32 at an intermediate location along the length of the first lever 24. Since the second chock 15 may extend lower than the remainder of the chock system 10, as the chock system 10 is lowered, the second chock 15 may be the first portion of the chock system 10 to contact the ground, road, floor, or other such surface. If the chock system 10 is also moved laterally in a direction from the second chock 15 toward the first chock 14, the friction between the second chock 15 and the ground may tend to cause the second chock 15 to drag on the ground and move slower than the first chock 14. This may allow the first chock 14 and the second chock 15 to become separated to a position as shown in FIG. 4, when the first chock 14 is dropped on the ground. Such a method of positioning the chock system 10 may use a "drag and drop" motion to position the chock system 10, and may be easily accomplished while a user is in a standing position. Further positioning of the chock system 10 may be accomplished, if necessary, by the user's foot. A force may then be applied to the first lever 24 and the second lever 32 to clamp the chock system 10 on the wheels 42, as shown in FIG. 5 and discussed above.

Figure 12:
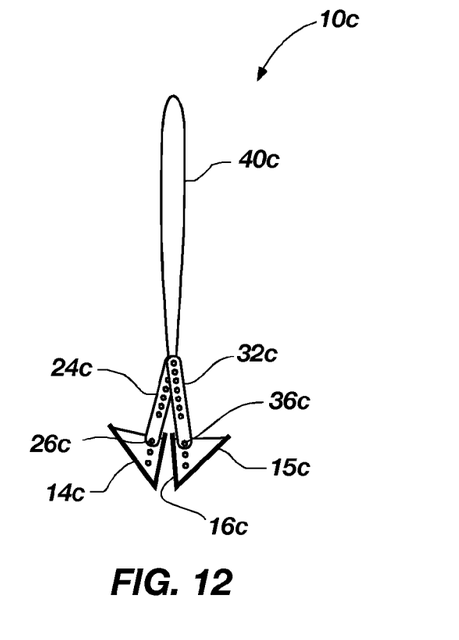
FIG. 12 is a side view of an alternative embodiment configuration of the chock system.

It will be understood that other methods of positioning the chock system 10 may be used in accordance with the principles of the present disclosure. For example, as shown in FIG. 12, which depicts an alternative embodiment arrangement of the chock system, indicated generally at 10c, a first lever 24c and second lever 32c may be arranged such that a first chock 14c and a second chock 15c may be positioned at a substantially even or level configuration. A force may be applied to the first chock 14c and the second chock 15c, such as a downward force with a user's foot, at a location between the chocks while the chocks are suspended by the handle 40c. The force may cause the first chock 14c to pivot about the first pivot 26c, and the second chock 15c to pivot about the second pivot 36c, to thereby rotate the first chock 14c and second chock 15c such that the base 16c may be oriented substantially parallel with the ground. For example, the first chock 15c may rotate clockwise about the first pivot 26c, and the second chock 15c may rotate counter-clockwise about the second pivot 36c, from the position of the chock system 10c shown in FIG. 12. The chock system 10c may be placed on the ground, then positioned and clamped in place as previously described.

It will be understood that as the linkage mechanism 22 is moved between the released position and the blocking position, the linkage mechanism 22 may pass through a center position in which no rotational forces are placed on the linkage mechanism 22 due to contact of the chocks 12 with the wheels 42. The linkage mechanism 22 may be placed in an "over-center" position when the chock system 10 is in the blocking position, such that the chock system 10 may remain in the blocking position due to a rotational force exerted on the linkage mechanism 22 due to contact of the chocks 12 with the wheels 42. An upward force on the linkage mechanism 22 by the handle 40 may be required to overcome the rotational force on the linkage mechanism 22 to release the chock system 10 from the wheels 42. Thus, the chock system 10 may remain in a substantially locked position without the use of an external locking device. In the blocking position, the chocks 12 may clamp onto the wheels 42 to reduce rolling movement of the wheels 42 in addition to providing an obstacle for the wheels to roll over. Accordingly, movement of the wheels 42 may be prevented or greatly reduced.

When the chock system 10 is in the blocking position, the handle 40 may remain in an upright position such that the user may simply grasp the handle 40 while the user remains standing. Some embodiments of the handle 40 may be configured and arranged to lean against the wheel 42 to maintain the handle 40 in an upright position. When the handle 40 is pulled upwardly, the linkage mechanism 22 may be released to draw the chocks 12 together such that the chock system 10 may be placed in a released position. The handle 40 may also be used to pull the chock system 10 out from between the wheels 42 such that the chock system 10 may be removed without requiring the user to bend or crouch. Accordingly, the chock system 10 may be easily and quickly removed.

In accordance with one feature of the present disclosure, the pivoting of the chocks 12 with respect to the linkage 22 about the first pivot 26 and the second pivot 36, allows for exceptional operation of the chocks 12 and locking mechanism. The articulating chocks 12 may be allowed to automatically align for maximum gripping power between the wheels and the ground. Moreover, the ability to adjust the chock system 10 with the variable openings 28, 29, 34 in the linkage 22 and the chocks 12 allows the chock system 10 to provide optimum leverage and pressure.

It will be understood that the chock system 10 may be configured to provide additional security against movement of the wheels 42 by applying a clamping force to the wheels 42. The linkage mechanism 22, including the first lever 24 and the second lever 32 may provide an increased leverage to increase the forces applied to the wheels 42. Moreover, the configuration of the chock system 10 may allow the over-center retaining action to secure the chock system 10 in place. By applying the clamping force on the wheels 42, the chocks 12 may prevent the wheels 42 from moving, and not merely create an obstacle for the wheels 42 to roll over. The chock system 10 may provide a braking force that may prevent the wheels 42 from starting to move, even a short distance, thereby preventing a vehicle from building up momentum that may cause the prior art chocks to fail. This may be particularly beneficial on sloped or slippery surfaces. Moreover, such a braking action may be beneficial in situations where movement may be caused within a vehicle, such as livestock within a trailer, for example. The wheel chock system 10 may provide a braking action to vehicles in such situations to improve the stability of the vehicles.

Referring now to FIGS. 6A-10, an alternative embodiment chock system is shown, indicated generally at 10a. As previously discussed, the presently preferred embodiments of the disclosure illustrated herein are merely exemplary of the possible embodiments of the disclosure, including that illustrated in FIGS. 6A-10.

It will be appreciated that the embodiment of the disclosure illustrated in FIGS. 6A-10 contains many of the same structures represented in FIGS. 1-5. New or different structures will be explained to most succinctly describe the additional advantages that come with the embodiments of the disclosure illustrated in FIGS. 6A-10.

Figures 6A, 6B, 7A, 7B:
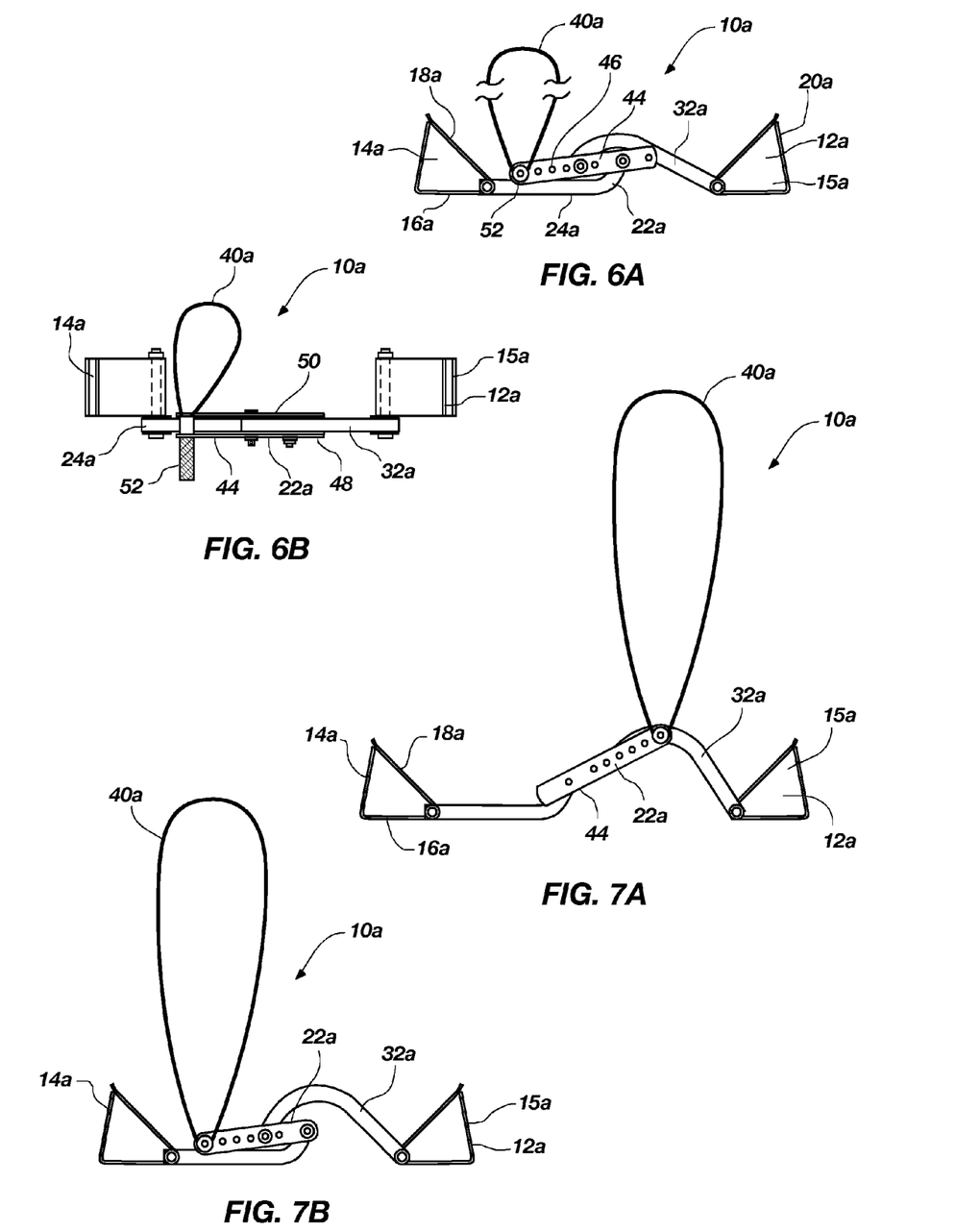
FIG. 6A is a side view of an alternative embodiment wheel chock system.
FIG. 6b is a top view of the wheel chock system of FIG. 6A.
FIG. 7A is a side view of the wheel chock system of FIG. 6A in a released position.
FIG. 7B is a side view of the wheel chock system of FIG. 6A in a blocking position.

FIG. 6A depicts a side view of an alternative embodiment wheel chock system 10a, whereas a top view of the alternative embodiment wheel chock system 10a is depicted in FIG. 6B. The alternative embodiment wheel chock system 10a may include chocks 12a including a first chock 14a and a second chock 15a. The chocks 12a may each be configured with a base 16a, a blocking surface 18a and a support 20a. It will be understood that the blocking surface 18a may be disposed in an interior facing direction, as opposed to the previously disclosed embodiment which may include the blocking surface 18 facing in an exterior direction. Accordingly, the blocking surface 18a of the first chock 14a may be configured to face in a direction towards the blocking surface 18a of the second chock 15a. Similar to the previously disclosed embodiment, it will be understood that the chocks 12a may be formed in various different configurations within the scope of the present disclosure.

The alternative embodiment wheel chock system 10a may also include a linkage mechanism 22a. The linkage mechanism 22a may include a first lever 24a that may be rotatably attached to the first chock 14a, and a second lever 32a that may be rotatably attached to the second chock 15a. It will be understood that the first lever 24a and the second lever 32a may be formed of round rod or tubular members. Alternatively, the first lever 24a and the second lever 32a may be formed of elongate flat members, or members having any other suitable configuration. One embodiment of the linkage mechanism 22a may be attached to the chocks 12a on a side of the chocks 12a, as shown most clearly in the top view of FIG. 6B. Accordingly, the space between the chocks 12a may remain unobstructed for receiving a wheel between the chocks 12a.

One embodiment of the first lever 24a may include a curve, such that an end of the first lever opposite the first chock 14a may be offset from a longitudinal axis of the first lever 24a. Similarly, the second lever 32a may also have a curve so as to mate with the first lever 24a. It will be understood that alternative embodiments of the first lever 24a and the second lever 32a may be formed having different shapes and configurations within the scope of the present disclosure.

The first lever 24a may be attached to the second lever 32a by a third lever 44. The third lever 44 may have a plurality of openings 46 for receiving pivots such that the first lever 24a and the second lever 32a may be attached at different locations on the third lever 44 to thereby adjust the wheel chock system 10a for attachment to different sized wheels.

As shown in FIG. 6B, the third lever 44 may be formed with a first portion 48 and a second portion 50 such that the first lever 24a and the second lever 32a may be received between the first portion 48 and the second portion 50. Alternatively, it will be understood that the third lever 44 may be formed as a one piece member so as to be disposed on a single side of the first lever 24a and the second lever 32a.

An actuator 52 may be attached to the third lever 44 for providing a surface for applying a force to rotate the third lever 44. The actuator 52 may be formed as a peg or handle to extend from the third lever 44 in a crosswise direction with respect to the third lever 44. One embodiment of the actuator 52 may be sized and configured to be moved by placing a user's foot on the actuator 52 to press the actuator 52 downwardly. It will be understood that the actuator 52 may be formed in various different sizes and configurations, and that some embodiments of the present disclosure may be formed without an actuator 52. Moreover, it will be understood that an actuator may also be used in combination with the chock system 10 discussed above with reference to FIGS. 1-5.

One embodiment of the wheel chock system 10a may also include a handle 40a. The handle 40a may be attached to the third lever 44 or actuator 52 and may extend upwardly, similar to the handle 40 disclosed above in the previously disclosed embodiment. Moreover, the handle 40a may also be configured to stand upright so that the handle 40a may be accessed without requiring the user to bend or crouch. Similar to the previously disclosed embodiment, the handle 40a may be flexible to allow for ease in manipulating and storage of the handle 40a, or the handle 40a may be formed of a substantially rigid member.

One embodiment of the chock system 10a may be configured such that the linkage mechanism 22a may move in a substantially planar area defined by movement paths of the first lever 24a, the second lever 32a and the third lever 44. The actuator 52 may be joined to the linkage mechanism 22a for receiving a force to move the linkage mechanism 22a between the released position and the blocking position. The actuator 52 may be configured to extend in a direction that may be transverse to the substantially planar area defined by movement paths of the first lever 24a, the second lever 32a and the third lever 44. One embodiment of the actuator 52 may extend in a direction substantially perpendicular to the first lever 24a, the second lever 32a and the third lever 44. However, it will be understood that alternative embodiments of the present disclosure may include an actuator 52 arranged in other orientations with respect to the linkage mechanism 22a.

Figure 8:
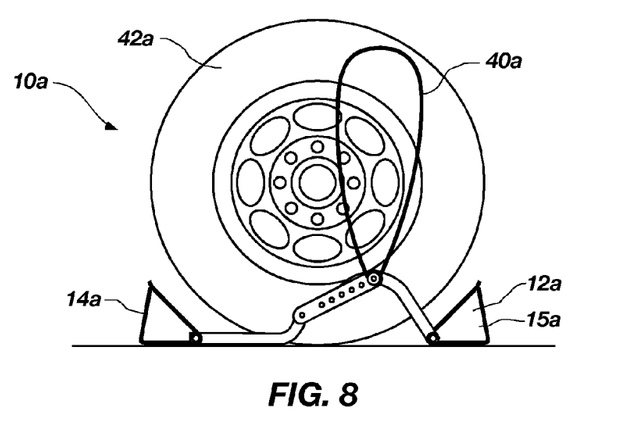
FIG. 8 is a side view of the wheel chock system of FIG. 6A in a released position prior to installation on a wheel.
Figure 9:
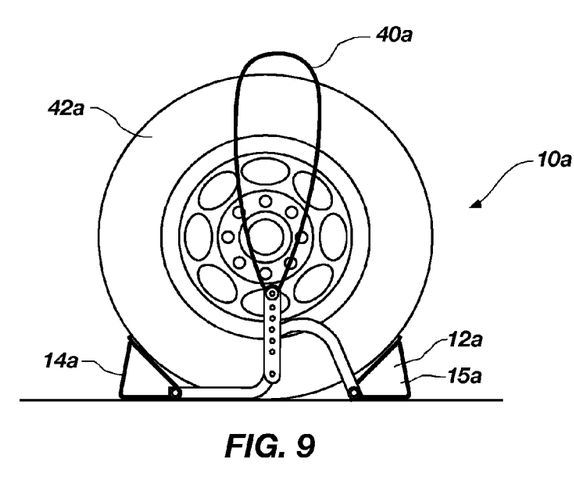
FIG. 9 is a side view of the wheel chock system of FIG. 6A in a partially blocking position with respect to a wheel.
Figure 10:
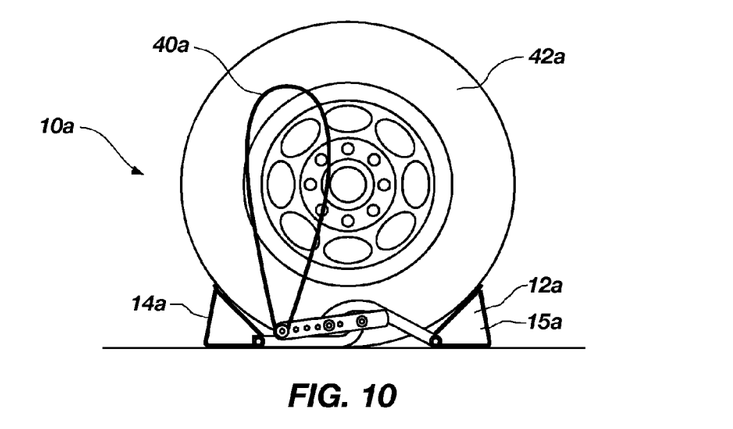
FIG. 10 is a side view of the wheel chock system of FIG. 6A in a blocking position with respect to a wheel.

In use, the chocks 12a may be placed on opposing sides of a wheel 42a, as shown most clearly in FIG. 8. The handle 40a may be lifted while the user is in a standing position to raise the third lever 44 and draw the chocks 12a together as shown in FIG. 9. The user may then step on the actuator 52, or otherwise press the actuator 52 downwardly, such that the chock system 10a may be positioned as shown in FIG. 10. It will be understood that when the chock system 10a is positioned in the blocking position as shown in FIG. 10, the chocks 12a may clamp onto the wheel 42a, and the linkage mechanism 22a may be placed in an "over-center" position so as to maintain the chock system 10a in the blocking position. The handle 40a may remain in a position to be accessed by a user while the user is in a standing position.

To remove the chocks from the wheel 42a, a user may grasp the handle 40a and pull the handle 40a in an upward direction to thereby move the third lever 44 up and move the chocks 12a apart to release the chocks 12a from the wheel 42a. The handle 40a may also be used to pull the chock system 10a out from under the wheel 42a. Accordingly, the user may install and remove the chock system 10a without ever needing to bend or crouch.

Figure 11:
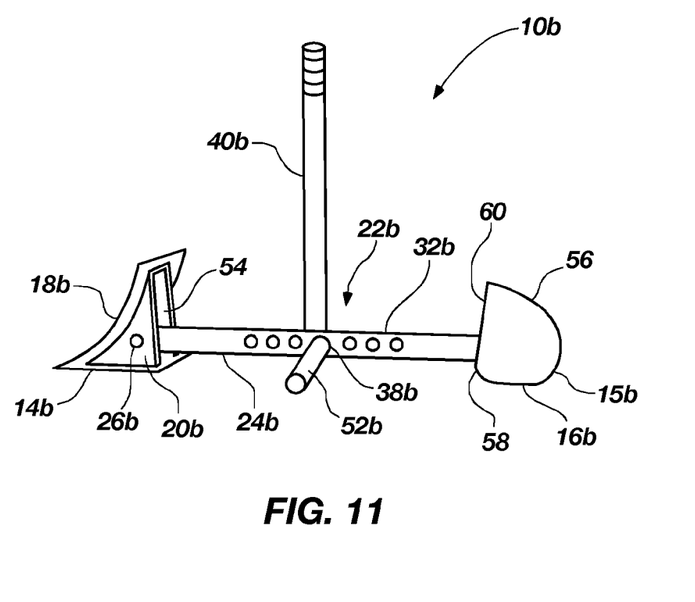
FIG. 11 is a perspective view of an additional alternative embodiment chock system.

Referring now to FIG. 11, another alternative embodiment chock system is shown, indicated generally at 10b. As previously discussed, the presently preferred embodiments of the disclosure illustrated herein are merely exemplary of the possible embodiments of the disclosure, including that illustrated in FIG. 11.

It will be appreciated that the embodiment of the disclosure illustrated in FIG. 11 contains many of the same structures represented in FIGS. 1-10. New or different structures will be explained to most succinctly describe the additional advantages that come with the embodiment of the disclosure illustrated in FIG. 11.

FIG. 11 depicts a perspective view of the alternative embodiment chock system 1ab, in which several different features are included. It will be understood that many of the features of the chock system 10b may be used in combination with the previously disclosed embodiments. Accordingly, the alternative embodiment chock system 10b may include a combination of features that may be interchanged with other features disclosed above.

The alternative embodiment chock system 10b may include a first chock 14b that may have a blocking surface 18b. The blocking surface 18b may be concave in shape to provide increased surface area contact area with wheels 42. Accordingly, a tight grip with the wheel 42 may be achieved over a larger portion of the wheel 42 and blocking surface 18b.

Also, the chock system 10b may include a support 20b that may include a slot 54 for receiving a first lever 24b therein. A first pivot 26b may pass through the support 20b and the first lever 24b to rotatably attach the first lever 24b to the support 20b. Accordingly, it will be understood that the first lever 24b may be formed of a single piece member. Moreover, the support 20b may be configured to define two spaced apart walls to provide increased bearing capacity to the blocking surface 18b.

The chock system 10b may also include a second chock 15b. The second chock 15b may have a curved blocking surface 56. It will be understood that the alternative embodiment chock system 10b may include the first chock 14b and the second chock 15b having different configurations. It will also be understood that the first chock 14b and the second chock 15b may have the same configuration with either the concave shape or the curve shape or any other suitable configuration.

In one embodiment of the present disclosure, the second lever 32b may be rigidly attached to the second chock 15b so as to be non-rotatable with respect to the second chock 15b. Accordingly, the second lever 32b and the second chock 15b may be formed of a single piece member. Alternative embodiments may also utilize this non-rotatable connection with respect to the first chock 14b, or the second lever 32b may be removably fixable to the second chock 15b to form two separate components joined together.

The chock system 10b may also include a handle 40b that may be rigid, such as a rigid rod, pole, or the like. The handle 40b may extend upwardly so as to be accessible by a user of the chock system 10b while the user is in a standing position. Accordingly, the user may easily position, manipulate or disengage the chock system 10b. The handle 40b may be rotatably attached to the first lever 24b and the second lever 32b through the third pivot 38b. Accordingly, it will be understood that the chock system 10b may be folded into a compact configuration about the third pivot 38b for storage or transporting the chock system 10b. Also, one embodiment of the handle 40b may be adjustable in length, whereas other embodiments may have a fixed length. The adjustable length embodiment may include a telescoping member, such that the handle 40b may be adjusted to various different lengths to increase the versatility of the handle 40b.

Another feature usable within the scope of the present disclosure includes an actuator 52b. The actuator 52b may be joined to the linkage 22b in any suitable location. For example, one embodiment of the present disclosure may include the actuator 52b positioned at or near the third pivot 38b. The actuator 52b may be configured for providing a surface for applying a force to rotate the linkage 22b to a blocking position similar to the actuator 52 discussed above. The actuator 52b may thus be formed as a peg, step, handle, or the like, to extend from the linkage 22b. A user may step on the actuator 52b to apply a locking force to the linkage 22b to allow a more stable chocking of the wheels. One embodiment of the actuator 52b may be removably attachable to the linkage 22b so as to be used or removed if desired.

Another feature that may be used with the various different embodiments of the chock systems disclosed herein will now be described with reference to the chock 15b. The chock 15b may include a turn 58 on the back side or support surface 60 of the chock 15b. It will be understood that a similar feature may be formed on the chock 14b, or the chocks 12 previously disclosed. The turn 58 may be configured with a rounded, curved or tapered shape, such that a transition between the base 16b and the support surface 60 is characterized by an absence of an abrupt edge, to facilitate removal of the chock system 10b. It will be understood that some embodiments of the chocks may have a shape having an abrupt edge that may have a tendency to dig into the ground. The shape of the turn 58 may be configured to reduce this tendency to facilitate removal of the chock system 10b.

It will be appreciated that operation of the chock system 10b may be accomplished similar to the previously disclosed embodiments. Moreover, it will be understood that one or both the chocks 14b, 15b may be placed against other objects besides wheels within the scope of the present disclosure.

It is to be understood that the term "linkage," as used herein, shall refer broadly, depending on embodiment, to one or more of the first lever 24, 24a, 24b, the second lever 32, 32a, 32b, and the third lever 44, but shall also refer to any item or system capable of accomplishing the functions of the linkage mechanism as described herein, even if such item or system does not include multiple levers or any levers.

It will be understood that the components forming the embodiments of the present disclosure may be manufactured using any suitable technique known to those skilled in the art. Moreover, any suitable material known to those skilled in the art may be used to make the chock system 10, 10a, 10b in accordance with the principles of the present disclosure.

It will be appreciated that the structures and apparatus disclosed herein are merely exemplary of "means for" performing a specified function. For example, the structures and apparatus disclosed herein are exemplary of a means for restraining movement of one or more wheels, a means for adjusting chocks between a blocking position and a released position, and a means for adjusting linkage means between a blocking position and a released position while a user is in a standing position. It should be appreciated that any structures, apparatus or systems for performing a specified function that perform functions the same as, or equivalent to, those disclosed herein are intended to fall within the scope of a means for performing the specified function, including those structures, apparatus or systems for performing the specified function that are presently known, or that may become available in the future. Anything which functions the same as, or equivalently to, a means for restraining movement of one or more wheels, a means for adjusting chocks between a blocking position and a released position, and a means for adjusting linkage means between a blocking position and a released position while a user is in a standing position, falls within the scope of these elements.

In accordance with the features and combinations described above, a useful method for blocking movement of one or more wheels may include:

connecting a pair of chocks together with a first lever and a second lever;

placing the pair of chocks against the one or more wheels;

rotating the first lever and the second lever to clamp the pair of chocks onto the one or more wheels; and releasing the pair of chocks from the wheels while remaining in a standing position.

It will be understood that another aspect of the present disclosure may include a method for blocking movement of one or more wheels in which the method may include:

providing two chocks for positioning against the one or more wheels;

intercoupling the chocks with a linkage;

adjusting an extent the chocks can move with respect to each other; and applying a force to the linkage to thereby rotate at least a portion of the linkage with respect to at least one of the chocks and to advance the chocks in opposing directions into contact with the one or more wheels.

In one embodiment, the step of applying a force may include applying a downward force, such as pressing down on the linkage with the foot of the user. It will also be understood that the chocks may be advanced in opposing directions towards each other, or away from each other.

Those having ordinary skill in the relevant art will appreciate the advantages provided by the features of the present disclosure. For example, it is a feature of the present disclosure to provide a wheel chock system that is simple in design and manufacture. Another feature of the present disclosure is to provide such a wheel chock system that can clamp on to one or more wheels to prevent the wheels from moving. It is a further feature of the present disclosure, in accordance with one aspect thereof, to provide a wheel chock system that can be installed and removed by a user while the user is in a standing position, without the need to bend or crouch. It is another feature of the present disclosure, in accordance with one aspect thereof, to provide a wheel chock system that may utilize a linkage mechanism that may be placed in an "over-center" position to maintain the wheel chock system in a blocking position. It is another feature of the present disclosure to provide a wheel chock system that can be folded into a compact configuration for transportation and storage.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A wheel chock system comprising:

a first chock and a second chock for restraining movement of one or more wheels;

a linkage mechanism rotatably connected to at least one of said first chock and said second chock, said linkage mechanism being adjustable to move said first chock and said second chock between a blocking position and a released position;

said linkage mechanism comprising a first lever rotatably connected to said first chock and a second lever rotatably connected to said second chock; and a joint assembly comprising a pin, said pin pivotally connecting the first lever and the second lever such that said first lever and said second lever are rotatable about said pin with respect to each other;

wherein said pin is discretely positionable along at least one of the first lever and the second lever such that a distance between the first chock and the second chock is adjustable;

wherein said joint assembly is positionable to an over-the-center locking position to thereby maintain said first chock and said second chock in the blocking position, wherein the joint assembly passes through a center position, in which no rotational forces are placed on the joint assembly due to contact of the chocks with the one or more wheels, before the joint assembly is positioned in an over-the-center blocking position such that the chock system may remain in the blocking position due to rotational forces exerted on the joint assembly; and a handle attached to said linkage mechanism, said handle extending upwardly to allow a user to adjust said linkage mechanism while said user is in a standing position.

2. The wheel chock system of claim 1, wherein said first chock and said second chock each comprise a base for contacting a floor surface, and a blocking surface for contacting a wheel.

3. The wheel chock system of claim 2, wherein said blocking surface of said first chock faces in a direction away from said blocking surface of said second chock.

4. The wheel chock system of claim 2, further comprising a support extending between said blocking surface and said base, wherein said linkage mechanism is attached to said support.

5. The wheel chock system of claim 1, wherein said joint assembly comprises a first plurality of holes formed in the first lever and a second plurality of holes formed in the second lever and wherein the pin is selectably insertable into any one of the first plurality of holes and any one of the second plurality of holes in a plurality of combinations.

6. The wheel chock system of claim 5, wherein said handle is connected to a terminal end of the first lever.

7. The wheel chock system of claim 2, wherein said blocking surface of said first chock faces in a direction towards said blocking surface of said second chock.

8. The wheel chock system of claim 1, wherein said linkage mechanism is disposed on a side of said first chock and said second chock to provide a space between said first chock and said second chock for receiving a wheel.

9. A wheel chock system comprising:
a first chock and a second chock for restraining movement of one or more wheels;
a linkage mechanism, wherein said linkage mechanism comprises a first lever rotatably connected to said first chock, and a second lever rotatably connected to said second chock, wherein said first chock comprises a support, and wherein said first lever comprises a first member disposed on a first side of said support, and a second member disposed on a second side of said support, said linkage mechanism being adjustable to move said first chock and said second chock between a blocking position and a released position;
said linkage mechanism being positionable to an over-the-center locking position to thereby maintain said first chock and said second chock in the blocking position, wherein the linkage mechanism passes through a center position in which no rotational forces are placed on the linkage mechanism before the linkage mechanism is positioned in an over-the-center locking position; and
flexible means for adjusting said linkage mechanism between said blocking position and said released position while a user is in a standing position;
wherein said flexible means comprises sufficient rigidity to stand upright unassisted and wherein said flexible means can be manipulated for storage.

10. The wheel chock system of claim 9, wherein said chock means comprises a first chock and a second chock.

11. The wheel chock system of claim 9, wherein said linkage means is rotatably connected to said chock means.

12. The wheel chock system of claim 9, wherein said linkage means comprises a first lever and a second lever, wherein said first lever is rotatably connected to said second lever.

13. The wheel chock system of claim 12, wherein said linkage means further comprises a third lever rotatably connected to said first lever and said second lever.

14. The wheel chock system of claim 13, further comprising an actuator joined to said third lever for providing a surface to apply a force to said linkage means.

15. The wheel chock system of claim 14, wherein said actuator extends in a transverse direction with respect to said third lever.

16. The wheel chock system of claim 9, wherein said linkage means is disposed on a side of said chock means to provide a space between said chock means for receiving a wheel.

17. The wheel chock system of claim 9, wherein said flexible means comprises a loop.

18. The wheel chock system of claim 9, wherein said linkage means is configured for being placed in an over-center position in the blocking position.

19. A wheel chock system comprising:
a first chock and a second chock for restraining movement of one or more wheels;
a linkage mechanism, wherein said linkage mechanism comprises a first lever rotatably connected to said first chock, and a second lever rotatably connected to said second chock, wherein said first chock comprises a support, and wherein said first lever comprises a first member disposed on a first side of said support, and a second member disposed on a second side of said support, said linkage mechanism being adjustable to move said first chock and said second chock between a blocking position and a released position;
said linkage mechanism being positionable to an over-the-center locking position to thereby maintain said first chock and said second chock in the blocking position, wherein the linkage mechanism passes through a center position in which no rotational forces are placed on the linkage mechanism before the linkage mechanism is positioned in an over-the-center locking position; and
a handle attached to said linkage mechanism, said handle extending upwardly to allow a user to adjust said linkage mechanism while said user is in a standing position; and
a lock hole in at least one of said first chock and said second chock, said lock hole configured for receiving a stop to contact said linkage mechanism to block movement of said linkage mechanism.

20. The wheel chock system of claim 19, further comprising a handle attached to said linkage, said handle extending upwardly to allow a user to adjust said linkage while said user is in a standing position.

21. The wheel chock system of claim 19, wherein said linkage is rotatably connected to at least one of said first chock and said second chock.

22. The wheel chock system of claim 19, wherein said linkage comprises a first lever rotatably connected to said first chock, and a second lever rotatably connected to said second chock.

23. The wheel chock system of claim 22, wherein said first lever and said second lever each comprise a plurality of openings for receiving a pivot to adjust a length of said linkage.

24. The wheel chock system of claim 22, further comprising a third lever rotatably connected to said first lever and said second lever.

25. The wheel chock system of claim 19, further comprising an actuator joined to said linkage for providing a surface to apply a force to said linkage, said actuator extending in a transverse direction with respect to said linkage.

* * * * *